(12) United States Patent
Poudrier

(10) Patent No.: US 9,175,497 B1
(45) Date of Patent: Nov. 3, 2015

(54) HITCH MOUNTED ACCESSORY HOLDER

(71) Applicant: Alan S Poudrier, Niceville, FL (US)

(72) Inventor: Alan S Poudrier, Niceville, FL (US)

( * ) Notice: Subject to any disclaimer, the term of this patent is extended or adjusted under 35 U.S.C. 154(b) by 6 days.

(21) Appl. No.: 14/303,995

(22) Filed: Jun. 13, 2014

(51) Int. Cl.
- *B60R 9/06* (2006.01)
- *E04H 15/32* (2006.01)
- *B60R 11/00* (2006.01)

(52) U.S. Cl.
CPC *E04H 15/32* (2013.01); *B60R 9/06* (2013.01); *B60R 2011/0085* (2013.01)

(58) Field of Classification Search
CPC ... B60R 9/06; B60R 9/08–9/12; E04H 15/06; E04H 15/32
USPC .................. 224/519; 135/88.05, 88.08, 88.13
See application file for complete search history.

(56) References Cited

U.S. PATENT DOCUMENTS

| | | |
|---|---|---|
| 5,094,373 A | 3/1992 | Lovci |
| 5,232,240 A | 8/1993 | Johnson |
| 5,330,084 A | 7/1994 | Peters |
| 5,454,496 A | 10/1995 | Sumida et al. |
| 5,518,159 A | 5/1996 | DeGuevara |
| 5,544,799 A | 8/1996 | Didlake |
| 5,752,636 A | 5/1998 | Manley |
| 5,775,560 A | 7/1998 | Zahn et al. |
| 5,853,278 A | 12/1998 | Frantz |
| 5,857,741 A | 1/1999 | Anderson |
| 5,950,617 A | 9/1999 | Lorenz |
| 6,189,458 B1 | 2/2001 | Rivera |
| D439,559 S | 3/2001 | Caro |
| 6,314,891 B1 | 11/2001 | Larson |
| 6,701,913 B1 | 3/2004 | LeDuc et al. |
| 6,722,380 B1 | 4/2004 | Hafer |
| 7,631,791 B1 | 12/2009 | Allen et al. |
| 7,757,613 B2 | 7/2010 | Fisher |
| 7,819,128 B2 | 10/2010 | Clark et al. |
| 8,123,190 B2 | 2/2012 | Kost |
| 8,286,843 B2 | 10/2012 | Bogoslofski et al. |
| 8,291,832 B2 | 10/2012 | Fisher |
| 8,485,207 B1 | 7/2013 | Boyington |
| 2006/0254635 A1 | 11/2006 | Matheus et al. |

*Primary Examiner* — Justin Larson
*Assistant Examiner* — Phillip Schmidt
(74) *Attorney, Agent, or Firm* — Peter Loffler

(57) ABSTRACT

A holder securely holds a canopy shade system for providing protection from sun or rain for a worker or during recreation. The holder is attached to a vehicle's trailer hitch via a receiver tube. A cross arm passes through the receiver tuber and is positionable between a squared position with respect to the receiver tube and an angled position. Telescoping extension arms extend outwardly from each end of the cross arm with a leg located on the distal end of each extension arm, each leg capable of holding an implement such as the canopy shade system.

20 Claims, 6 Drawing Sheets

HITCH MOUNTED ACCESSORY HOLDER

BACKGROUND OF THE INVENTION

1. Field of the Invention

The present invention relates to a device that received within a typical trailer square hitch receiver found on a vehicle, wherein the device holds accessories such as a framed canopy and wherein the holding apparatus is pivotable between a squared position and an angled position.

2. Background of the Prior Art

Many workers, such as municipal workers and municipal support workers, telephone company technicians, cable technicians, and others spend a large portion of their day working outdoors, either installing an item, such as a traffic light control box for the municipality or repairing the previously installed item. Such workers tend to drive from one job site to another in a pickup truck or van wherein the tools and equipment of the trade are stored. Upon arrival at the job site, the tools, parts, and other equipment needed are unloaded and the work at hand begins. While many workers find this type of work environment particularly enjoyable, Mother Nature can have an adverse effect on a given work day. If the sun is blazing or the rain is pouring, the outdoor worker needs to protect himself or herself from the elements. If the particular job site is surrounded by a grass or other natural area, then the worker can erect a beach type umbrella to help shield the work from the sun or the rain. Although not completely effective, some shade is better than no shade on a hot muggy sun drenched summer afternoon. Unfortunately, many work sites are such that an umbrella cannot be ground inserted. A worker repairing a manhole cover in a downtown street has no effective ability to erect a beach umbrella. Although the worker can carry a standalone base for the umbrella, such bases are bulky, heavy and may take up too much real estate in the work vehicle.

Recognizing the limitations of a beach type umbrella, many workers carry about pop up canopy shade systems. Such canopy shade systems have an easy open frame that unfolds from its stored configuration in very short order onto which a shade canopy s secured. Set up and tear down of such canopies is very quick and easy. While more effective and versatile than a beach umbrella, such canopy shade systems are not without their limitations. Such systems are designed to be ground secured either by passing ground anchors through appropriate openings located at the base of the frame post of the canopy frame or via guy wires that are pin secured to the ground. Much like the beach type umbrella, such securement means are not always available to the worker. If the canopy shade system is not secured, then even a modest wind can carry the canopy shade system away, potentially damaging the device and possibly even causing a traffic accident. Additionally, even if the canopy shade system can be ground secured, a worker will often need to move the device a small amount at a given job site. For example, the job site may be such that the canopy system does not cover the entire area and as the worker moves between one area of the site and the other located a short distance away, the canopy shade system needs to be moved the short distance to provide its protection. Such movement of the canopy can become quite laborious and time-consuming. In such a scenario, the worker may spend more time and effort moving the canopy shade system back and forth than on the actual task at hand.

What is needed is a system that secures a canopy shade system frame irrespective of the ground upon which the canopy shade system is placed. Such a system must hold the canopy frame securely irrespective of weather conditions. Such a system must permit rapid changing of the position of the canopy shade system as the worker moves about the job site and needs the shading effect delivered by the canopy shade system to move with the worker.

SUMMARY OF THE INVENTION

The hitch mounted accessory holder of the present invention addresses the aforementioned needs in the art by providing a device that secures to the trailer hitch of a vehicle and holds a canopy shade system frame securely without the need to further secure the canopy shade system frame to the ground for use by workers, tailgaters and other recreational users, etc. The hitch mounted accessory holder allows the canopy frame to be moved in very short order. The hitch mounted accessory holder is of relatively simple design and construction, being produced using standard manufacturing techniques, so as to be relatively inexpensive to produce so as to be economically attractive to potential consumers of this type of device. The hitch mounted accessory holder is easy to install onto the vehicle and secure to the canopy shade system frame and just as easy to break down at the end of the task.

The hitch mounted accessory holder of the present invention is comprised of a receiver tube that has a first end and a second end, and a top and a bottom joined by a first side and an opposing second side. The receiver tube also has a first opening with a first edge and a second edge disposed on its first side and a second opening with a third edge and a fourth edge disposed on its second side such that the first edge and the third edge are disposed equidistant to the first end of the receiver tube while the fourth edge is located relatively closer to the second end of the receiver tube compared to the location of the second edge (the second opening is wider relative to the width of the first opening). Either the first end or the second end of the receiver tube is removably received within the hitch receiver of a vehicle such that either the bottom or the top of the receiver tube faces toward a ground level. A generally rectangular shaped tubular cross arm has a third end and an opposing fourth end and third side and an opposing fourth side. The cross arm passes horizontally through the first opening and the second opening of the receiver tube and is pivotally secured to the receiver tube such that the cross arm is rotatable between a first position wherein the third side of the cross arm abuts the first edge of the first opening and the third edge of the second opening (the cross arm is squared with respect to the receiver tube, that is, the longitudinal axis of the cross arm is generally perpendicular to the longitudinal axis of the receiver tube) and a second position wherein the third side of the cross arm abuts the first edge of the first opening and the fourth side of the cross arm abuts the fourth edge of the second opening (the cross arm is angled with respect to the receiver tube, that is, the longitudinal axis of the cross arm is at an angle (non-perpendicular and non-parallel) with respect to the longitudinal axis of the receiver tube). The first edge is inwardly beveled toward the second end of the receiver tube and the fourth edge is outwardly beveled toward the second end of the receiver tube such that the first edge is parallel with the third side of the cross arm and the fourth edge is parallel with the fourth side of the cross arm whenever the cross arm is in the second position. A first extension arm has a fifth end and an opposing sixth end such that the fifth end of the first extension arm is removably receivable within the third end of the cross arm while a second extension arm has a seventh end and an opposing eight end such that the seventh end of the second extension arm is removably receivable within the fourth end of the cross arm. The first extension arm and the second extension arm are each telescoping. A first leg is attached to the sixth end of the first extension arm, the first leg having a first longitudinal channel therethrough, while a second leg is attached to the eight end of the second extension arm, the second leg having a second longitudinal channel therethrough. The first leg is positionable between a third position wherein a first longitudinal axis of the first channel is on a gravitationally vertical axis and a fourth position wherein the first longitudinal axis of the first channel is at an angle relative to the gravitationally vertical axis and the second leg is positionable between a fifth position wherein a second longitudinal axis of the second channel is on the gravitationally vertical axis and a sixth position wherein the second longitudinal axis of the second channel is at an angle relative to the gravitationally vertical axis.

BRIEF DESCRIPTION OF THE DRAWINGS

Similar reference numerals refer to similar parts throughout the several views of the drawings.

DESCRIPTION OF THE PREFERRED EMBODIMENT

Figure 1:
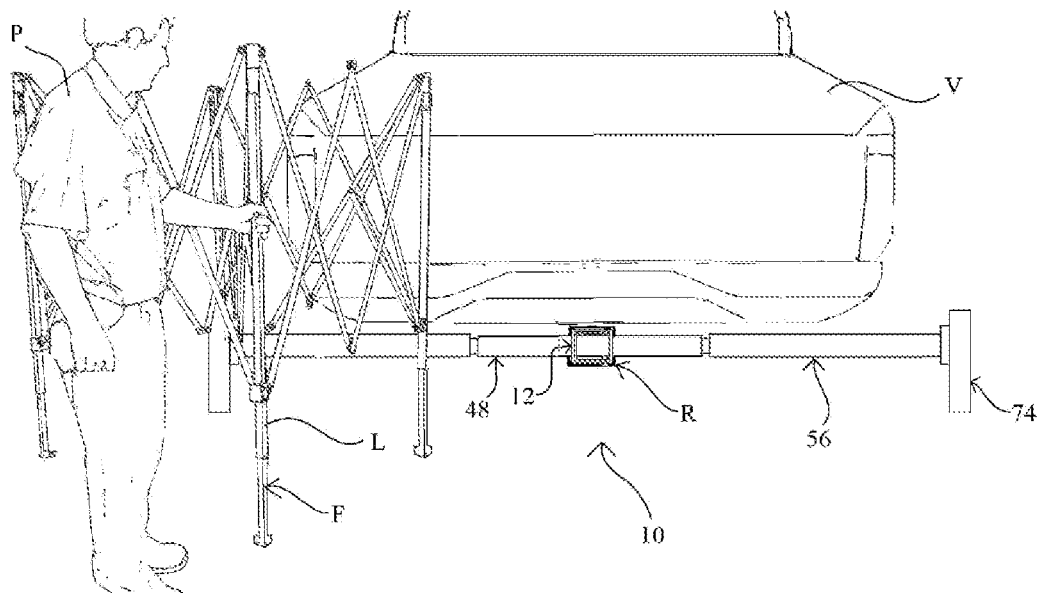
FIG. 1 is an environmental view of the hitch mounted accessory holder of the present invention with a canopy shade system frame secured thereto.
Figure 2:
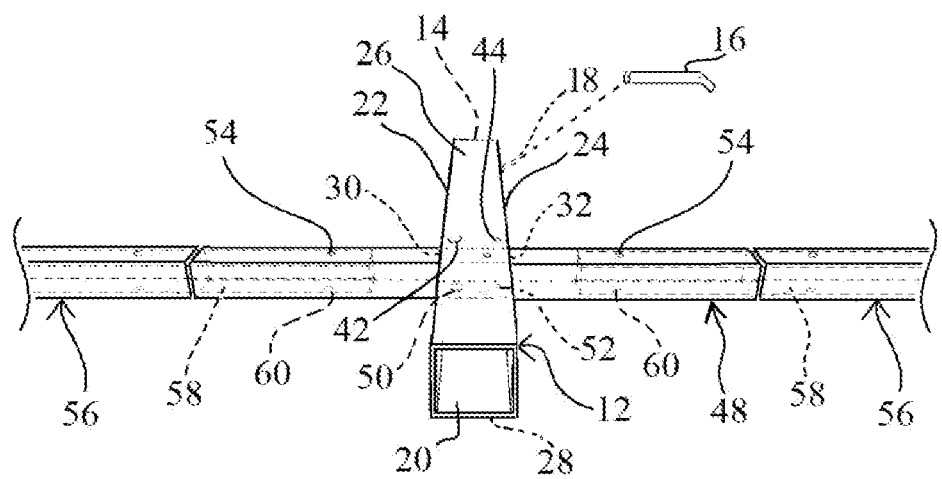
FIG. 2 is a perspective view of the receiver tube used with the hitch mounted accessory holder.
Figure 3:
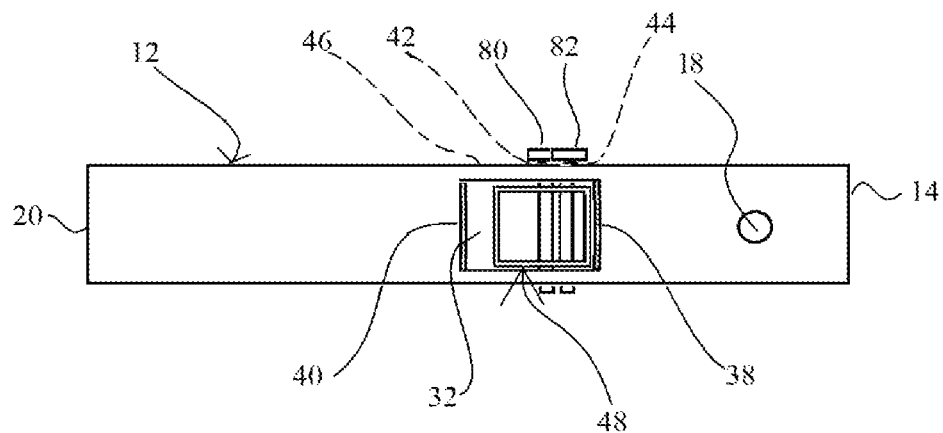
FIG. 3 is a left side elevation view of the receiver tube.
Figure 4:
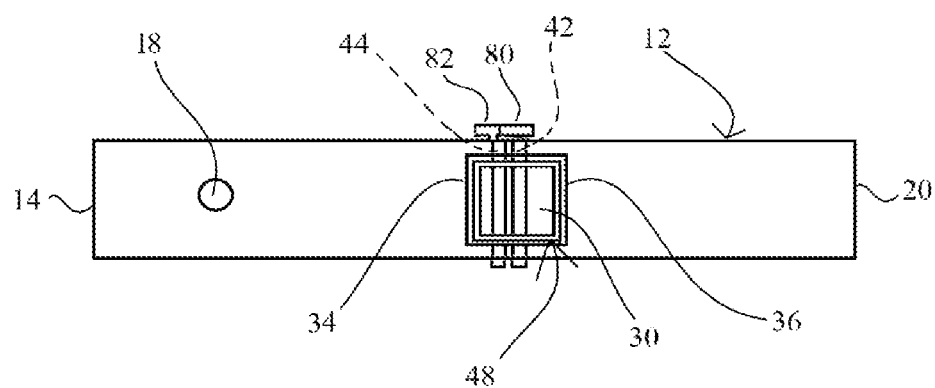
FIG. 4 is a right side elevation view of the receiver tube.
Figure 5:
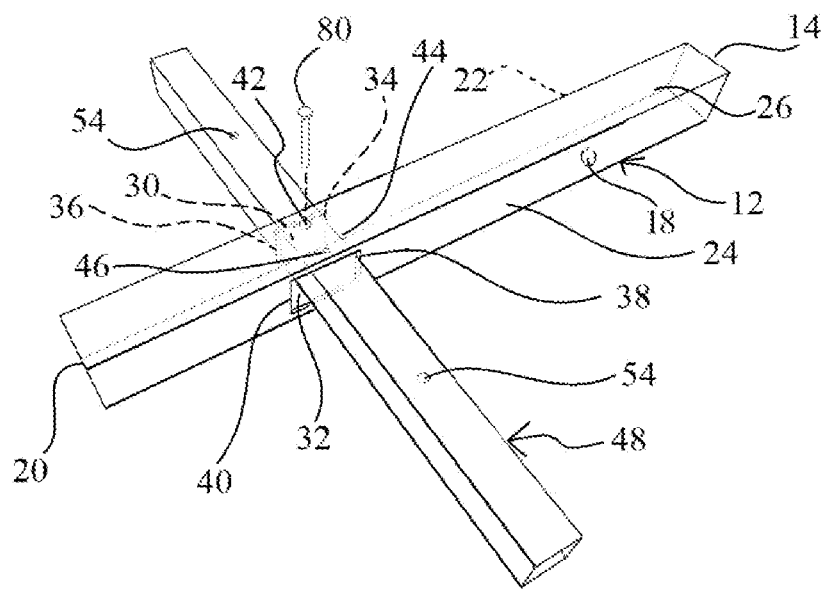
FIG. 5 is a perspective view of the cross arm positioned within the receiver tube.
Figure 6:
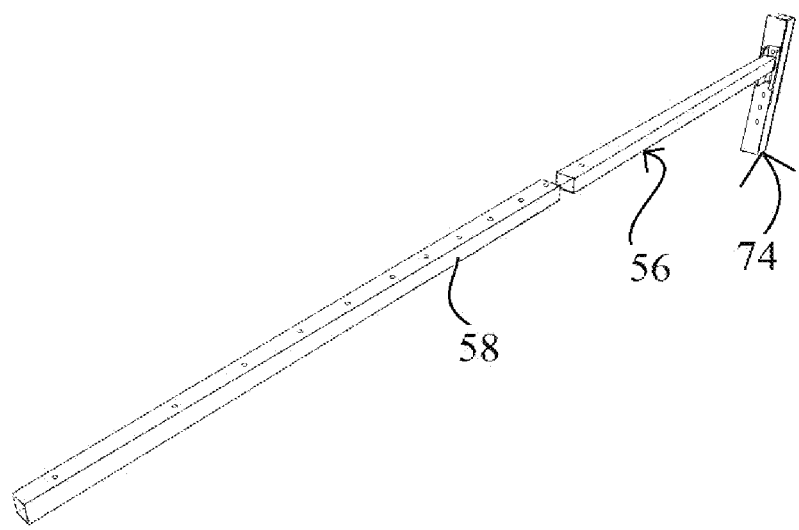
FIG. 6 is a perspective view of one of the extension arms used with the hitch mounted accessory holder.

Referring now to the drawings, it is seen that the hitch mounted accessory holder of the present invention, generally denoted by reference numeral 10, is comprised of a receiver tube 12 that has a first end 14 that is removably receivable within the trailer hitch receiver R of a vehicle V in appropriate fashion and secured thereto by inserting a pin 16 through openings 18 that align with corresponding openings (not illustrated) on the trailer hitch receiver R, the receiver tube 12 also having a second end 20. The receiver tube 12 is a square tube stock member that has a first side 22 and an opposing second side 24, joined by a top 26 and a bottom 28. A first generally rectangular shaped opening 30 is located on the first side 22 while a second generally rectangular shaped opening 32 is located on the second side 24 of the receiver tube 12. The first opening 30 has a first side edge 34 and a second side edge 36 while the second opening 32 has a third side edge 38 and a fourth side edge 40. The first side edge 34 of the first opening 30 and the third side edge 38 of the second opening 30 (the side edges 34 and 38 closer to the first end 14 of the receiver tube 12) are generally parallel and aligned with one another and are of the same height. However, as seen, the fourth side edge 40 of the second opening 32 is closer to the second end 20 of the receiver tube 12 relative to the second side edge 36 of the first opening 30. These two side edges 36 and 40 are of the same height so that the first opening 30 and the second opening are of substantially similar height, however, the second opening 32 is wider laterally (side edge to side edge) relative to the width of the first opening 30, the second opening 32 being on the order of about 50 percent wider relative to the width of the first opening 30, although the width differential can be more or less than this approximate 50 percent depending on the desired angle of rotation of the device as more fully discussed below. As seen, the second side edge 36 of the first opening 30 is inwardly beveled or tapered toward the second end 20 of the receiver tube 12 while the fourth side edge 40 of the second opening 32 is outwardly beveled or tapered toward the second end 20 of the receiver tube 12. A first pair of corresponding pivot openings 42 is located on the top 26 and bottom 28 of the receiver tube 12 proximate the first side 22, while a first pair of corresponding securement openings 44 is located on the top and bottom 28 of the receiver tube proximate the second side 24 thereof and at least one second pair of corresponding securement openings 46 is located on the top 26 and bottom 28 of the receiver tube 12 also proximate the second side 24.

A cross arm 48 is provided and is a square tube stock member that has a centrally disposed second pair of corresponding pivot openings 50 and a centrally disposed third pair of corresponding securement openings 52. A fourth pair of corresponding securement openings 54 is located proximate either end of the cross arm 48.

An extension arm 56 is removably secured to each end of the cross arm 48. As seen, each extension arm 56 comprises a connector tube 58 that has a fifth pair of corresponding securement openings 60 on an end thereof and a series of sixth corresponding securement opening pairs 62 located along the length of the connector tube 58. An outer tube 64 has a seventh pair of corresponding securement openings 66 on a first end 68 thereof. A flange 70 is secured to an opposing second end 72 of the outer tube 64 in appropriate fashion (welding, etc.).

A leg 74 is provided and is a square tube stock member with one of the its sides essentially open save for a small lip 76 running down each edge of the open side. The leg 74 has a series of eight corresponding securement openings 78 located along its height.

Figure 7:
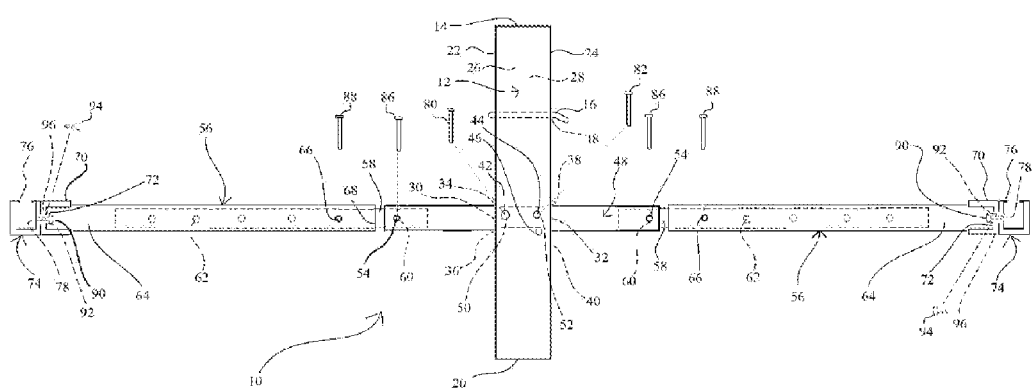
FIG. 7 is a top plan view of the hitch mounted accessory holder in a squared position.
Figure 8:
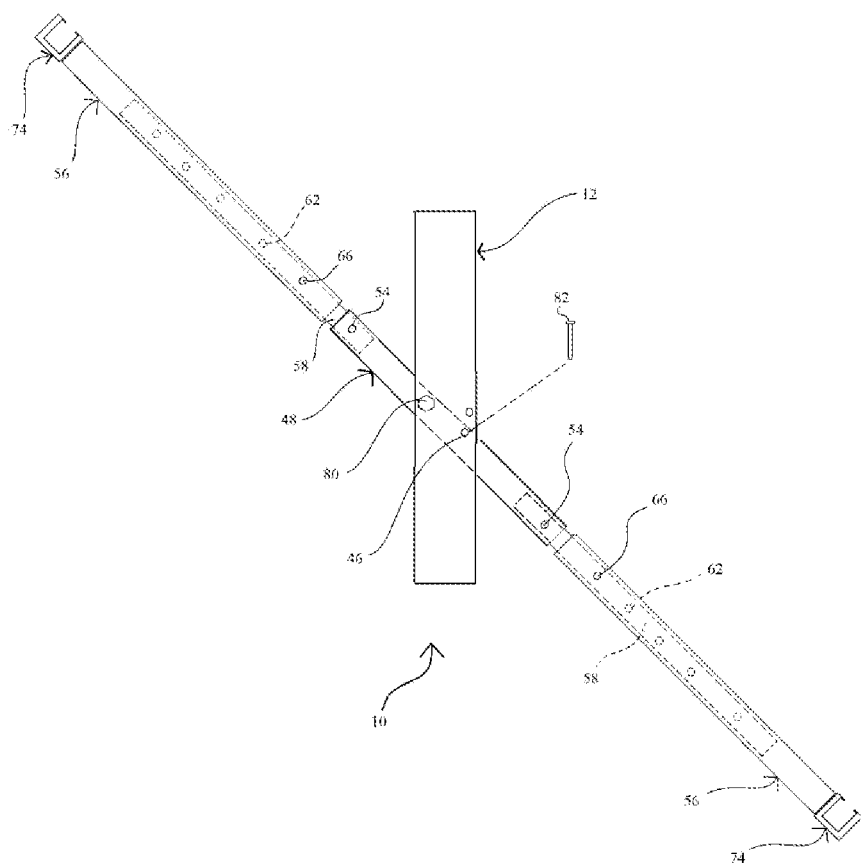
FIG. 8 is a top plan view of the hitch mounted accessory holder in an angled position.
Figure 9:
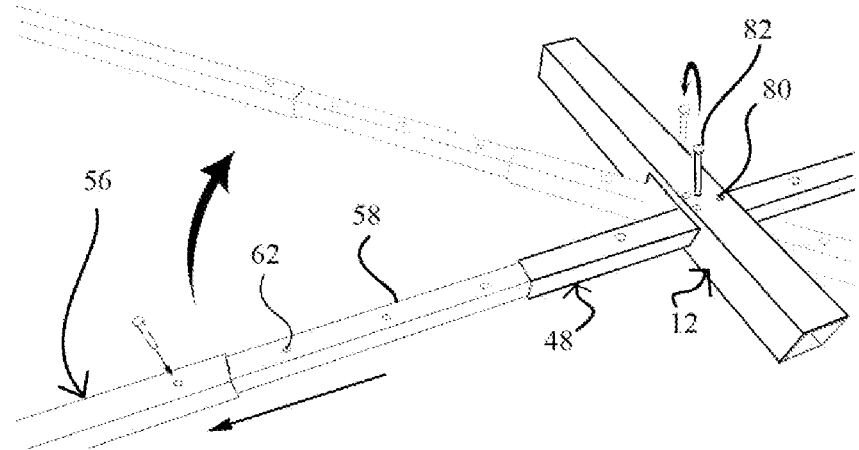
FIG. 9 is a perspective view of the hitch mounted accessory holder illustrating the changing of the position of the cross arm.
Figure 10:
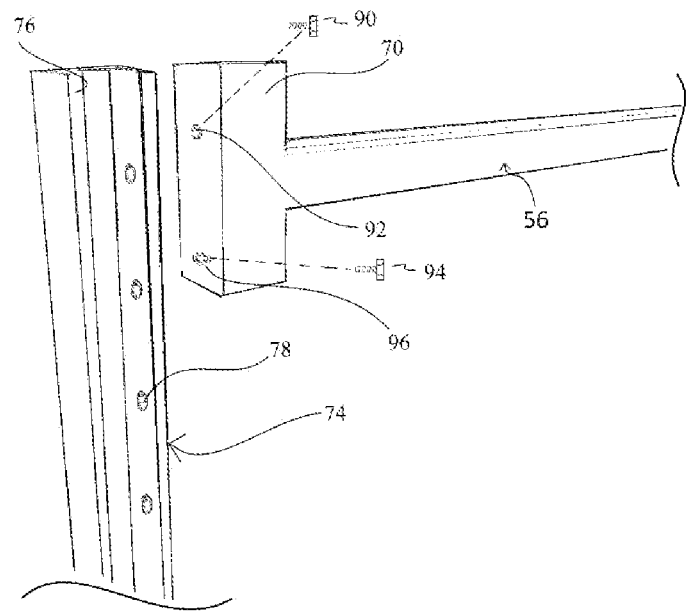
FIG. 10 is a close-up perspective view of the extension arm mating with the leg.

In order to use the hitch mounted accessory holder 10 of the present invention, the first end 14 of the receiver tube 12 is received within the hitch receiver R of the vehicle V in appropriate fashion and pin secured thereat. The receiver tube 12 is positioned such that the two openings 30 and 32 face outwardly and either the top 26 or the bottom 28 of the receiver tube 12 faces toward the ground V. The cross arm 48 is passed through the first opening 30 and the second opening 32 such that the second pair of pivot openings 50 of the cross arm 48 align with the first pair of pivot openings 42 located on the receiver tube 12. A pivot pin or bolt 80 is passed through the aligned openings 42 and 50 in order to pivotally secure the cross arm 48 to the receiver tube 12. The cross arm 48 is positioned as desired, either in a squared position, as seen in FIG. 7 wherein the cross arm 48 and the receiver tube 12 are essentially normal to one another, or an angled position, as seen in FIG. 8, wherein the cross arm 48 and the receiver tube 12 are angularly disposed with respect to one another. If the cross arm 48 is in the squared position, then the third pair of securement openings 52 of the cross arm 48 is aligned with the first pair of securement openings 44 of the tube receiver 12 and a pin or bolt 82 is passed through the aligned openings 44 and 52. In this squared position, a side of the cross arm 48 generally abuts the first side edge 34 of the first opening 30 and the third side edge 38 of the second opening 32. If the cross arm 48 is in the angled position, then the third pair of securement openings 52 of the cross bar 48 is aligned with the second pair of securement openings 46 of the receiver tube 12 and a pin or bolt 84 is passed through the aligned openings 46 and 52. In this angled position, a side of the cross arm 48 generally abuts the second side edge 36 of the first opening 30 and the fourth side edge 40 of the second opening 32, the beveling of the side edges 36 and 40 helping give a more secure hold of the cross bar 48 to the receiver tube 12. In the angled position, the side of the cross arm 48 that extends out from the second opening 32 pivots away the vehicle V on that side, so that if this side of the cross arm 48 is to pivot away from the passenger side of the vehicle V, then the second opening 32 faces outwardly in the passenger side direction. If the cross arm 48 is instead to pivot away from the driver's side of the vehicle V, then the receiver tube 12 is flipped 180 degrees within the receiver hitch R so that the second opening 32 faces outwardly in the driver's side direction of the vehicle V—of course the openings can be such that the first edge of the first opening and the third edge of the second opening are still parallel yet closer to the second end of the receiver tube (the end opposite the end that is received within the receiver hitch R), such reversal being a mere equivalent of the described invention.

Each extension arm 56 is attached to a respective one end of the cross arm 48 by sliding the connector tube 58 into the cross arm 48 and aligning the fourth pair of securement openings 54 of the cross arm 48 with the fifth pair of securement openings 60 of the connector tube 58 and passing a pin or bolt 86 through the aligned openings 54 and 60. The outer tube 64 receives the opposing end of the connector tube 58 and the seventh pair of securement openings 66 of the outer tube 64 are aligned with a respective one pair of sixth securement openings 62 on the connector tube 58 depending on the desired length of extension of the extension arm 56 that is desired and passing a pin or bolt 88 through the aligned openings 62 and 66. Of course, the extension arm need not be telescoping but can be made of a single arm, however for versatility (including being able to accommodate canopy shade systems of various widths) and for ease of storage and transport, the break down telescoping nature of the extension arm 56 is preferred.

The height of each leg 74 is adjusted as needed by a pivot pin or bolt 90 that passes through an upper opening 92 located on the flange 70 and through a respective one of the desired securement openings 78 located on the leg 74. A second pin 94 passes through a lower opening 96 located on the flange 70 below the upper opening 92, this lower opening 96 being horizontally oblong in order to allow the longitudinal angle of the leg 74 to pivot between being essentially vertical and being angled. This angling of the leg 74 may be necessary as the legs L of many fully erected canopy frames F tend to be slightly angled so that the longitudinal angle of the leg 74 is adjusted to match the angle of the frame post L of the canopy shade system.

The various pins or bolts are secured in any desired fashion after being passed through their respective aligned openings (cotters, etc.,).

An appropriate device, such as the frame post L of the frame F of the canopy shade system is secured to the leg 74 by positioning a portion of the frame post L within the channel of the leg 74 and adjusting the longitudinal angle of the leg 74 as needed. Advantageously, the channel within the leg 74 is sufficient in size to allow the frame post L of the canopy shade system to rotate therein in order to allow the canopy shade system to be rotated into a desired position, as may be necessary as the sun travels across the sky. A second frame post L of the canopy shade system may be secured within the opposing leg 74 on the opposing extension arm 56—or a second canopy shade system (or other implement) can be secured within this opposing leg 74. The frame post L is held within the channel of the leg 74 via the small lip 76, however, a set screw (not illustrated) or other appropriate device can be used for a more secure hold of the frame post L (or other device) within the channel of the leg 74.

If the worker P decides to move the canopy shade system, say from the squared position to the angled position, then the pin 82 is removed from the first securement openings and third securement openings 52 and the cross arm 48 is rotated until its third securement openings 52 align with the second securement openings 46 of the receiver tube 12 and the pin 82 is inserted through the now aligned second securement openings 46 and third securement openings 52.

Of course, other implements can be substituted for one or both of the legs 74 depending on the user's needs by unbolting the leg 74 from the flange 70 and bolting the desired implement to the flange 70. Such implements can include a beach type of umbrella holder, a grill holder, a fishing pole holder (none illustrated), etc.

When use of the hitch mounted accessory holder 10 is no longer needed, the various pins are unpinned from their respective parts, the various components are decoupled from one another, the receiver tube 12 is unpinned and detached from the trailer hitch receiver R and the device is stored in appropriate fashion.

While the invention has been particularly shown and described with reference to an embodiment thereof, it will be appreciated by those skilled in the art that various changes in form and detail may be made without departing from the spirit and scope of the invention.

I claim:

1. A mounting system secured to a square hitch receiver attached to a vehicle, the mounting system comprising:
    a receiver tube having a first end and a second end, a top and a bottom joined by a first side and an opposing second side, the receiver tube also having a first opening with a first edge and a second edge disposed on the first side and a second opening with a third edge and a fourth edge disposed on the second side such that the first edge and the third edge are disposed equidistant to the first end of the receiver tube while the fourth edge is located relatively closer to the second end of the receiver tube compared to location of the second edge, either the first end or the second end of the receiver tube adapted to be removably received within the hitch receiver such that either the bottom or the top of the receiver tube faces toward a ground level; and
    a generally rectangular shaped tubular cross arm having a third end and an opposing fourth end and a third side and an opposing fourth side, the cross arm passing horizontally through the first opening and the second opening of the receiver tube and pivotally secured to the receiver tube such that the cross arm is rotatable between a first position wherein the third side of the cross arm abuts the first edge of the first opening and the third edge of the second opening and a second position wherein the third side of the cross arm abuts the first edge of the first opening and the fourth side of the cross arm abuts the fourth edge of the second opening.

2. The mounting system as in claim 1 wherein the first edge is inwardly beveled toward the second end of the receiver tube and the fourth edge is outwardly beveled toward the second end of the receiver tube such that the first edge is parallel with the third side of the cross arm and the fourth edge is parallel with the fourth side of the cross arm whenever the cross arm is in the second position.

3. The mounting system as in claim 2 further comprising an extension arm having a fifth end and an opposing sixth end, the fifth end of the extension arm removably receivable within the third end of the cross arm.

4. The mounting system as in claim 3 wherein the extension arm is telescoping.

5. The mounting system as in claim 3 further comprising a leg attached to the sixth end of the extension arm, the leg having a longitudinal channel therethrough.

6. The mounting system as in claim 5 wherein the leg is position between a third position wherein a longitudinal axis of the channel is on a gravitationally vertical axis and a fourth position wherein the longitudinal axis of the channel is at an angle relative to the gravitationally vertical axis.

7. The mounting system as in claim 2 further comprising:
a first extension arm having a fifth end and an opposing sixth end, the fifth end of the first extension arm removably receivable within the third end of the cross arm; and
a second extension arm having a seventh end and an opposing eight end, the seventh end of the second extension arm removably receivable within the fourth end of the cross arm.

8. The mounting system as in claim 7 wherein the first extension arm and the second extension arm are each telescoping.

9. The mounting system as in claim 7 further comprising:
a first leg attached to the sixth end of the first extension arm, the first leg having a first longitudinal channel therethrough; and
a second leg attached to the eight end of the second extension arm, the second leg having a second longitudinal channel therethrough.

10. The mounting system as in claim 9 wherein the first leg is positionable between a third position wherein a first longitudinal axis of the first channel is on a gravitationally vertical axis and a fourth position wherein the first longitudinal axis of the first channel is at an angle relative to gravitationally vertical axis and the second leg is position between a fifth position wherein a second longitudinal axis of the second channel is on the gravitationally vertical axis and a sixth positionable wherein the second longitudinal axis of the second channel is at an angle relative to the gravitationally vertical axis.

11. A mounting system secured to a square hitch receiver attached to a vehicle, the mounting system comprising:
a receiver tube having a first end and a second end, a top and a bottom joined by a first side and an opposing second side, the receiver tube also having a first opening with a first edge and a second edge disposed on the first side and a second opening with a third edge and a fourth edge disposed on the second side, either the first end or the second end of the receiver tube adapted to be removably received within the hitch receiver such that either the bottom or the top of the receiver tube faces toward a ground level; and
a generally rectangular shaped tubular cross arm having a third end and an opposing fourth end and a third side and an opposing fourth side, the cross arm passing horizontally through the first opening and the second opening of the receiver tube and pivotally secured to the receiver tube such that the cross arm is rotatable between a first position wherein a first longitudinal axis passing through the receiver tube and a second longitudinal axis passing through the cross arm are oriented in perpendicular fashion to one another and a second position wherein the first longitudinal axis and the second longitudinal axis are oriented in non-perpendicular and non-parallel fashion to one another.

12. The mounting system as in claim 11 wherein the first edge is inwardly beveled toward the second end of the receiver tube and the fourth edge is outwardly beveled toward the second end of the receiver tube such that the first edge is parallel with the third side of the cross arm and the fourth edge is parallel with the fourth side of the cross arm whenever the cross arm is in the second position.

13. The mounting system as in claim 12 further comprising an extension arm having a fifth end and an opposing sixth end, the fifth end of the extension arm removably receivable within the third end of the cross arm.

14. The mounting system as in claim 13 wherein the extension arm is telescoping.

15. The mounting system as in claim 13 further comprising a leg attached to the sixth end of the extension arm, the leg having a first longitudinal channel therethrough.

16. The mounting system as in claim 15 wherein the leg is positionable between a third position wherein a third longitudinal axis of the channel is on a gravitationally vertical axis and a fourth position wherein the third longitudinal axis of the channel is at an angle relative to the gravitationally vertical axis.

17. The mounting system as in claim 12 further comprising:
a first extension arm having a fifth end and an opposing sixth end, the fifth end of the first extension arm removably receivable within the third end of the cross arm; and
a second extension arm having a seventh end and an opposing eight end, the seventh end of the second extension arm removably receivable within the fourth end of the cross arm.

18. The mounting system as in claim 17 wherein the first extension arm and the second extension arm are each telescoping.

19. The mounting system as in claim 17 further comprising:
a first leg attached to the sixth end of the first extension arm, the first leg having a first longitudinal channel therethrough; and
a second leg attached to the eight end of the second extension arm, the second leg having a second longitudinal channel therethrough.

20. The mounting system as in claim 19 wherein the first leg is positionable between a third position wherein a third longitudinal axis of the first channel is on a gravitationally vertical axis and a fourth position wherein the third longitudinal axis of the first channel is at an angle relative to the gravitationally vertical axis and the second leg is positionable between a fifth position wherein a fourth longitudinal axis of the second channel is on the gravitationally vertical axis and a sixth position wherein the fourth longitudinal axis of the second channel is at an angle relative to the gravitationally vertical axis.

* * * * *